United States Patent [19]

Rizzo

[11] 3,994,355

[45] Nov. 30, 1976

[54] WHEEL ASSEMBLY

[76] Inventor: Michael J. Rizzo, 160 Waldemar Ave., East Boston, Mass. 02128

[22] Filed: May 19, 1975

[21] Appl. No.: 578,509

[52] U.S. Cl. .................................. 180/75; 301/1; 301/124 H; 308/210
[51] Int. Cl.² ........................................ B60K 23/00
[58] Field of Search ............... 301/1, 5, 124 R, 126, 301/131, 132, 124 H; 308/210; 180/70 R, 10, 88, 75

[56] References Cited
UNITED STATES PATENTS

| | | | |
|---|---|---|---|
| 1,783,780 | 12/1930 | Evans | 180/70 R |
| 2,570,191 | 10/1951 | Beckwith | 180/75 |
| 3,023,057 | 2/1962 | Edwards | 180/88 X |

Primary Examiner—Stanley H. Tollberg
Assistant Examiner—H. Grant Skaggs
Attorney, Agent, or Firm—Leslie J. Hart

[57] ABSTRACT

An improved wheel assembly includes a pair of contact bearings which are displaced from the vertical center line of the wheel for reducing frictional forces and the required torque in rotating the wheel. The bearings contact the inner surface of a drum having a pair of side plates, one of which has a central aperture. A weight bearing sleeve is located through the aperture and includes sleeve extension arms which are affixed to the contact bearings. A rotatable axle is located within the sleeve and extends through the drum so that the axle may be affixed to the other side plate of the drum. The drum thus rotates with the axle, and the vehicle weight is transferred from the sleeve to the drum by the two contact bearings which rotate in place.

13 Claims, 5 Drawing Figures

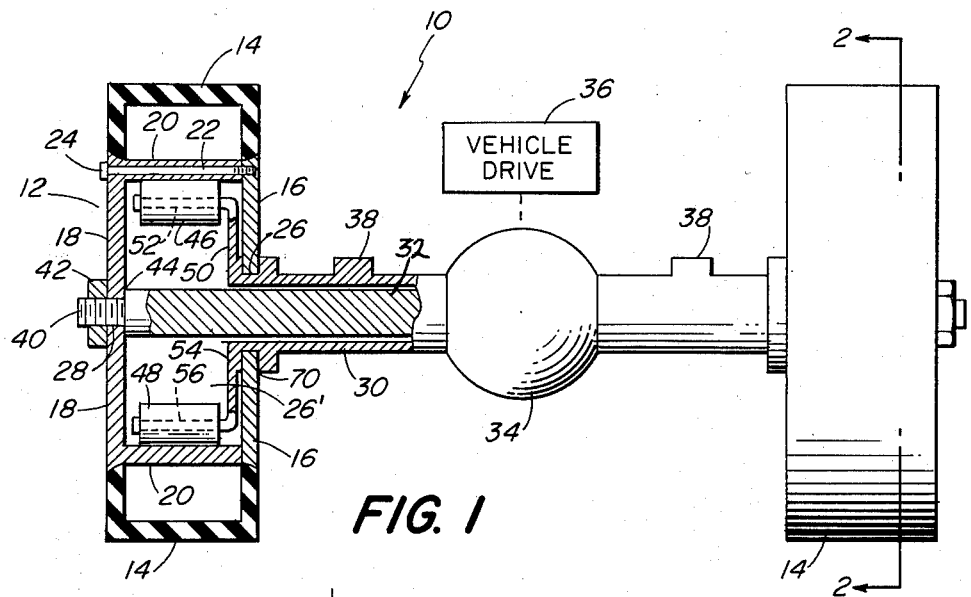
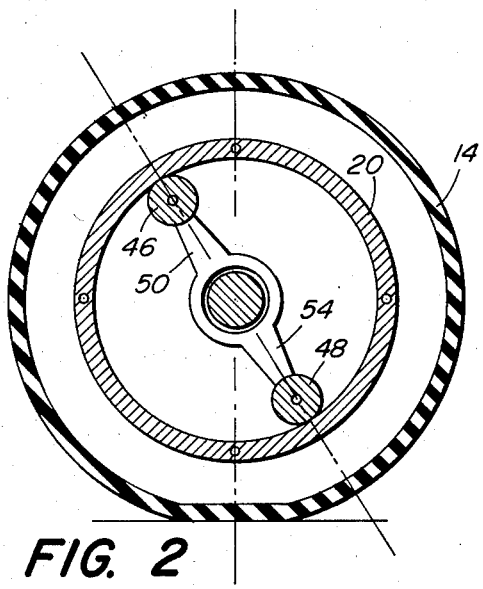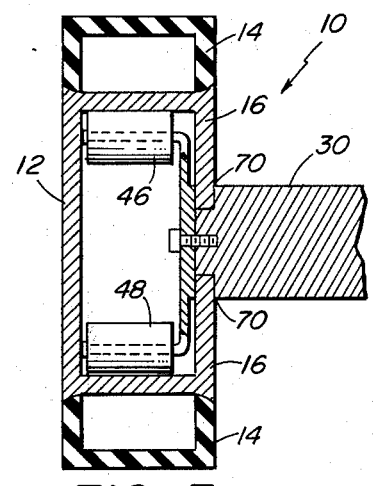
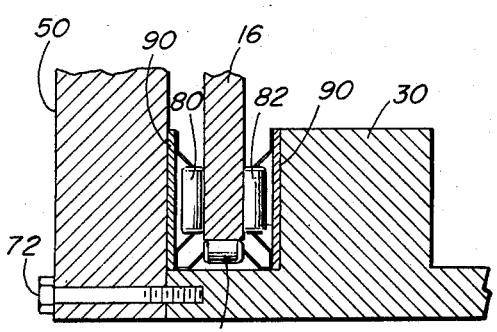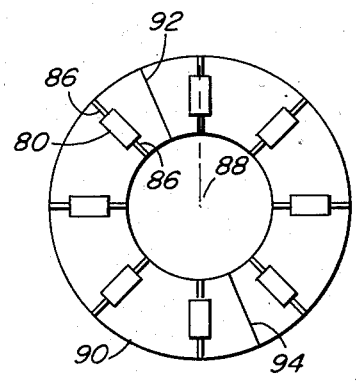

3,994,355

WHEEL ASSEMBLY

BACKGROUND OF THE INVENTION

The present invention relates to wheel assemblies for land vehicles, and more specifically, to an arrangement of bearings for transferring the vehicle weight to the rotating wheel.

The art of vehicle wheel assemblies and bearings used therein is well developed. The bearing is a mechanical structure used to bear the friction occasioned when mechanical parts are in contact and have relative motion. Bearings used when the relative motion is rotation, such as in a wheel assembly for a vehicle, may be classified as journal bearings or as antifriction or ball and roller bearings. A typical ball bearing assembly includes an outer race which fits on the housing, an inner race which fits on this rotatable shaft or axle, the cage or retainer which separates the balls and keeps them properly spaced and a plurality of ball bearings disposed about the periphery of the assembly. While the purpose of the bearing is to reduce frictional forces, both static and dynamic, between contacting rotating and non-rotating mechanical parts, the known bearing assemblies do not eliminate the frictional forces. These forces of course must be overcome by the torque developed by the drive system of the vehicle. Thus, a wheel assembly having an arrangement of bearings which would further reduce friction and consequently the required drive torque, would be quite useful, especially in light of the growing demand and lessening supply of liquid fossil fuels for internal combustion engines.

SUMMARY OF THE INVENTION

It is an object of the present invention to provide an improved wheel assembly for a land vehicle, such as an automobile or a bicycle.

It is another object of the invention to provide a wheel assembly having an arrangement of bearings which has less friction than known wheel assemblies by reducing the number of bearings.

It is still an additional object to provide a wheel assembly which reduces both the friction and the required drive torque of the vehicle by controlling the location of the bearings with respect to the wheel drum.

It is an additional object to provide an improved wheel assembly for both a drive wheel and a follow wheel and to provide an improved device for laterally supporting the wheel with respect to the shaft.

According to the present invention, an improved wheel assembly for a land vehicle has a drum having first and second spaced plates and a circular tire mounting member affixed to the plates to define an internal cylindrical region. The first plate has a centrally located aperture and a non-rotatable vehicle weight bearing shaft extending through the aperture. Accordingly, a bearing assembly includes a pair of contact bearings disposed within the internal region of the drum, the bearings being in contact with the inner surface of the cylindrical members. The bearings are rotatively coupled to the non-rotating shaft so the bearings are disposed between the rotating wheel and the non-rotating shaft. One feature of the invention is displacing the axis of rotation of the bearings from the center line of gravity of the drum to reduce the required drive torque. Preferably, the bearings are located along a line intersecting the center of the drum so that one bearing is located in the upper half of the internal region while the other bearing is on the lower half. By this arrangement, a greater proportion of the vehicle weight is directed through the lower contact bearing.

The wheel assembly also includes an auxiliary bearing arrangement for providing lateral support of the wheel. Also, when the wheel assembly is used as a drive wheel, the shaft is formed as a sleeve, and a rotatable axle is located within the sleeve and is affixed to the second plate of the wheel drum.

BRIEF DESCRIPTION OF THE DRAWINGS

In the drawing:

FIG. 1 is a side elevational view in section of a drive wheel assembly according to the present invention.

FIG. 2 is an end elevational view in section of the drive wheel assembly shown in FIG. 1.

FIG. 3 is a side elevational view in section of a follow wheel assembly according to the present invention.

FIG. 4 is a sectional view of a bearing arrangement for providing lateral support.

FIG. 5 is another view of a portion of the bearing arrangement for providing lateral support.

DESCRIPTION OF PREFERRED EMBODIMENTS

In an exemplary embodiment of the present invention, as illustrated in FIGS. 1 and 2, there is provided an improved wheel assembly represented generally by the reference numeral 10. In FIGS. 1 and 2, the assembly 10 is a drive wheel assembly for a land vehicle such as an automobile, whereas in FIG. 3, the assembly is a follow wheel assembly such as a front wheel for an automobile. It is to be understood however that the principle of the present invention is equally applicable to other land vehicles, including bicycles. The assembly 10 has a drum 12 around which a tire 14 may be mounted. The drum 12 includes a first and a second wheel plate 16 and 18, respectively and a circular tire mounting member 20 which define an internal cylindrical region 26'. The first and second plates 16 and 18 form inner and outer plates, respectively, with respect to the vehicle of which the assembly 10 forms a part. The plate 16 is formed with a centrally located aperture 26, which preferably is circular in shape.

Preferably, the plates and the mounting member are affixed by forming the second plate 18 and the tire mounting member 20 as a unitary element and fastening this element to the first plate 16. To facilitate removal of the tire 14 from the assembly 10, the fastening is preferably accomplished through the use of threaded bolts 22 positioned in aligned threaded openings in the lateral dimension of the tire mounting member 20 and the thickness dimension of the first and second plates 16 and 18. The head 24 of the bolt 22 is located at the outer side of the drum 12 so that the bolt may be readily removed when necessary.

The assembly 10 also includes a non-rotatable vehicle weight bearing shaft 30 which extends through the aperture 26 in the first plate 16. When the shaft 30 is used in a drive wheel assembly, such as illustrated in FIG. 1 and 2, the shaft 30 is preferably formed as a sleeve which is disposed around a rotatable axle 32. The sleeve 30 extends from a housing 34 for the differential gear assembly (not shown). The differential gear assembly couples torque from a vehicle drive assembly 36, which includes the engine, transmission and drive shaft, to the rotatable axle 32. Preferably, the shaft or sleeve 30 has vehicle weight supporting elements 38. In FIG. 1, a device is included for attaching the axle 32 to the drum 12 so that the drum rotates with the axle to produce vehicle motion. The device includes a non-circular shaped central aperture formed in the second or outer plate 18, a threaded end 40 of the axle cooperatively engaged in the aperture and a fastener, such as a threaded nut 42, engaging the end 40 of the axle 32. Preferably, the end of the axle is formed with a shoulder 44 which abuts against the inner wall of the second plate 18 to provide the wheel with lateral support with respect to the sleeve 30 and the axle 32.

According to the present invention, the assembly 10 includes a bearing assembly located within the internal region 26' for reducing the frictional forces and the torque necessary to rotate the drum 12 and tire 14 thereby moving the vehicle. The bearing assembly has a pair of contact bearings 46 and 48 disposed within the central region 26' and in contact with the inner surface of the circular tire mounting member 20. The bearings are rotatively coupled to the non-rotatable sleeve or shaft 30. This coupling, for example, for the upper contact bearing 46, is preferably accomplished by an extension arm 50 which is rigidly affixed at one end to the end of the shaft 30 and which, at its other end, has an outwardly extending shaft 52. The shaft 52 is located in a central aperture in the contact bearing 46 so that the bearing may rotate with respect to the shaft 52 and thus to the vehicle itself. An identical extension arm 54 and a shaft 56 form the coupling of the contact bearing 48 to the main shaft 30.

One principle feature of the invention resides in displacing the axes of rotation of the bearings 46 and 48 from the center line of gravity, line 60 in FIG. 2, of the drum 12. By this arrangement, advantage is taken of the following principle. When an object, such as a long bar, in a horizontal positon is supported at its two extreme ends, the amount of weight exerted by the object on each support is one half the total weight of the object. As the object is rotated from a horizontal to a vertical orientation, the amount of weight exerted on the low support increases while the amount of weight exerted on the high support decreases. The weight at each support is a function of the angle formed between the longitudinal axis of the object and the center line of gravity of the object. Thus, in the present invention, by displacing the contact bearings from the center line of gravity, a greater proportion of the vehicle weight is exerted on the part of the drum which contacts the lower contact bearing. This weight imbalance tends to aid in rotating the wheel thereby reducing the torque necessary to move the vehicle. Furthermore, the principle reduces the frictional forces associated with a wheel bearing assembly because with only two bearings, as opposed to the plurality of main bearings in known wheel assemblies, there is less contact of bearings with other parts of the wheel assembly.

Preferably, as shown in FIG. 1, the axes of the contact bearings are in a line that passes through the center of the wheel drum so that one contact bearing is in the upper half of the internal region while the other contact bearing is in the lower half of the internal region. Also, it is also preferred, although not necessary, that the lower bearing be located in the forward half of the internal region and that the upper bearing be located in the rearward half of the internal region. In the embodiment of FIG. 2, the right side of the wheel is the normal forward direction of the vehicle. The particular angle between the center line of gravity and the axis through the centers of the two bearings may vary between the angles of 0° and 90°; however, the angle is preferably about 45°.

Referring now to FIG. 3, the wheel assembly is a follow wheel, such as a front wheel on an automobile. In this embodiment, the weight bearing shaft 30 is solid and no axle is used. The contact bearings 46 and 48 are, as in FIGS. 1 and 2 for the drive wheel assembly, displaced from the center line of gravity of the wheel drive 12.

As stated previously, the wheel assembly, be it a drive or follow wheel assembly, preferably includes a means for laterally supporting the drum with respect to the weight bearing shaft. For the drive wheel assembly in FIGS. 1 and 2, the support may be accomplished by the shoulder 44 which abuts the inner surface of the plate 18. FIGS. 1, 2 and 3 show the details of an additional support means which is applicable to both the drive and follow wheel assemblies. In these figures, the weight bearing shaft 30 is formed with a U-shaped channel 70 which extends around the circumference of the shaft, the first plate 16 aligned with respect to the channel 70 so that the plate material defining this aperture is located within the channel. This arrangement prevents the drum from moving laterally with respect to the shaft 30. In FIGS. 1 and 3, the shaft material defining the left side of the channel 70 may be removable from the rest of the shaft 30 by fasteners 72 in FIG. 4 shown so that the plate 16 may be inserted into and removed from the U-shaped channel 70.

FIGS. 4 and 5 illustrate an alternative embodiment of the arrangement of the channel 70 receiving the plate 16. FIG. 4 shows a thrust bearing assembly disposed within the channel 70 for reducing the frictional forces between the shaft 30 and the first plate 16. The thrust bearing assembly includes a first plurality 80, a second plurality 82, and a third plurality 84 of spring loaded roller thrust bearings. Each bearing rotates about a tension spring element 86 which preferably is formed from ring metal. The bearings 80 and 82 are spaced circumferentially around the first plate 16 and engage each side of the first plate 16. The bearings 80 and 82 are further affixed through the spring elements 86 to the inner walls of the channel 70. As shown more clearly in FIG. 5, which is a view of the first plurality of bearings 80 as viewed from the plate 16, the bearings are arranged such that their axes of rotation intersect the center line as shown at 88. Preferably, the springs 86 are not affixed directly to the shaft 30 but instead are affixed to a flat plate 90 shown in FIGS. 4 and 5. The plate 90 may be formed in two pieces as shown at 92 and 94 in FIG. 5, for ease in inserting the bearings and the plate 90 into the channel 70. The means for affixing the springs 86 to either the plate 90 or the shaft 30 is not illustrated; however, one suitable means is welding. Suitable fasteners, such as a bolt (not shown) may be used for affixing the plate 90 to the shaft 30. In operation, the first and second bearings 80 and 82 aid in inhibiting lateral movement, reducing frictional forces between the plate 16 and the shaft 30 and minimizing the tendency for water or moisture from entering the wheel. Preferably, the first and second plurality 80 and 82 of roller bearings each include eight bearings spaced every 45° around the first plate 16.

The third plurality 84 of spring loaded roller thrust bearings is spaced circumferentially around the first plate and engages the material of the first plate defining the centrally located aperture. The bearing 84 is affixed through the spring elements 86 to the lower side of the U-shaped channel 70. The springs may be attached directly to the shaft 30, such as by welding, or they may be attached to a circular flat plate (not shown) but similarly to the embodiment in FIG. 5. The principle purpose of the third plurality 84 of thrust bearings is to prevent the first plate 16 from grinding into the shaft 30 if the contact bearings 46 and 48 should wear down.

The embodiments of the present invention are intended to be merely exemplary and those skilled in the art shall be able to make numerous variations and modifications to them without departing from the spirit of the present invention. For example, the wheel assembly for both the drive and follow wheel may be utilized for other land vehicles, especially for the bicycle. In this example, the sleeve and shaft extend through apertures in each of the first and second plates 16 and 18, and the sprocket in the bicycle drive wheel is affixed to the axle. Also, for the bicycle example and also if desired for the automobile, each contact bearing may be affixed to the shaft by two extension arms, one on each side of the contact bearing. Further lateral support may be obtained by the interaction of these extension arms and the inner walls of the first and second plates 16 and 18. This lateral support may also be accompanied by a thrust bearing assembly similar to the pluralities 80 and 82 of bearings in FIGS. 4 and 5. All such modifications and variations are intended to be within the scope of the present invention as defined by the following claims:

I claim:
1. An improved wheel assembly for a land vehicle, including:
   a. a drum having first and second spaced plates and a circular tire mounting member affixed to the plates to define an internal cylindrical region, the first plate being formed with a centrally located aperture;
   b. a non-rotatable vehicle weight bearing shaft extending through the aperture, and
   c. bearing means including a pair of contact bearings disposed within the internal region of the drum and in, rotating contact with the inner surface of the circular member, the bearings being rotatively at a fixed position mounted to the non-rotating shaft so that the bearings rotate at fixed positions with respect to the non-rotatable shaft, the axes of rotation of the bearings being displaced from the center line of gravity of the drum to reduce the frictional forces and the torque necessary to rotate the drum.

2. The assembly according to claim 1 wherein the internal region has an upper and a lower half, one bearing being in the upper half and the other bearing being in the lower half.

3. The assembly according to claim 2 wherein the internal region is divided into a forward side and a rearward side, the lower bearing being in the forward side and the upper bearing being in the rearward side.

4. The assembly according to claim 3 wherein the wheel assembly is a drive wheel and the shaft is formed as a sleeve and further including a rotatable axle disposed in the sleeve and means for attaching the axle to the wheel drum to transmit the torque from the axle to the drum.

5. The assembly according to claim 4 wherein the other one of the plates is formed with a central aperture and wherein the attaching means include the end of the axle being disposed through the aperture in the other plate and a fastener engaging the axle end.

6. The assembly according to claim 4 wherein the end of the sleeve includes extension arms affixed thereto which extend to and are rotatively coupled to the contact bearings.

7. The assembly according to claim 1 further including means for laterally supporting the drum with respect to the shaft.

8. The assembly according to claim 7 wherein the supporting means includes forming the shaft with a generally U-shaped circumferential channel and aligning the first plates such that the plate material defining the aperture is located within the channel, the channel thereby providing lateral support as the wheel plate rotates therewithin.

9. The assembly according to claim 8 further including thrust bearing means disposed within the groove for reducing the frictional forces between the shaft and the first plate.

10. The assembly according to claim 7 wherein lateral support means includes forming the end of the axle with a shoulder which abuts the inner surface of the second plate to provide lateral support for the drum with respect to the shaft.

11. An improved wheel assembly for a land vehicle, including:
   a. a drum having first and second spaced plates and a circular tire mounting member affixed to the plates to define an internal cylindrical region, the first plate being formed with a centrally located aperture;
   b. a non-rotatable vehicle weight bearing shaft extending through the aperture; and
   c. bearing means including a pair of contact bearings disposed within the internal region of the drum and in contact with the inner surface of the circular member, the bearings being rotatively coupled to the non-rotating shaft, the axes of rotation of the bearings being displaced from the center line of gravity of the drum to reduce the fricional forces and the torque necessary to rotate the drum;
   d. means for laterally supporting the drum with respect to the shaft, including: the shaft being formed with a generally U-shaped circumferential channel and the first plate being aligned such that the plate material defining the aperture is located within the channel, the channel thereby providing lateral support as the wheel plate rotates therewithin, and thrust bearing means disposed within the channel for reducing the frictional forces between the shaft and the first plate, the thrust bearing means including a first and second plurality of spring loaded roller thrust bearings being spaced circumferentially around the first plate and engaging each side of the first plate, the roller bearings being affixed through the springs to the inner walls of the channel and having their axes of rotation intersecting the center line of the shaft.

12. The assembly according to claim 11 further including a third plurality of spring loaded roller thrust bearings being spaced circumferentially around the first plate and engaging the material of the first plate defining the centrally located aperture, the third plurality of roller bearings being affixed through the springs to the lower side of the channel.

13. The assembly according to claim 12 wherein the ends of the first, second and third plurality of roller bearings are rounded.

* * * * *